United States Patent [19]
Gauthier

[11] Patent Number: 5,557,152
[45] Date of Patent: Sep. 17, 1996

[54] 2-POLE SINGLE OR DUAL COIL MOVING MAGNET MOTOR WITH MOVING BACK IRON

[75] Inventor: Raymond G. Gauthier, Santa Cruz County, Calif.

[73] Assignee: Seagate Technology, Inc., Scotts Valley, Calif.

[21] Appl. No.: 459,635

[22] Filed: Jun. 2, 1995

Related U.S. Application Data

[63] Continuation of Ser. No. 276,874, Jul. 18, 1994, abandoned, which is a continuation of Ser. No. 541,845, Jun. 21, 1990, abandoned.

[51] Int. Cl.$^6$ .............................. H02K 37/00; G11B 5/48
[52] U.S. Cl. .................................. 310/46; 360/104
[58] Field of Search ...................... 310/40 R, 46, 310/154, 156; 360/104–109

[56] References Cited

U.S. PATENT DOCUMENTS

| | | | |
|---|---|---|---|
| 4,476,404 | 10/1984 | Bygdnes | 360/105 |
| 4,544,972 | 10/1985 | Kogure et al. | 360/105 |
| 4,551,645 | 11/1985 | Takahashi et al. | 310/46 |
| 4,635,151 | 1/1987 | Hazebrouck | 360/105 |
| 4,716,483 | 12/1987 | Walsh | 360/106 |
| 4,775,908 | 10/1988 | Ycas | 360/106 |
| 4,814,909 | 3/1989 | Brown et al. | 360/78.07 |
| 4,879,617 | 11/1989 | Sampietro et al. | 360/106 |
| 4,985,652 | 1/1991 | Oudet et al. | 360/106 |
| 5,034,837 | 7/1991 | Schmitz | 360/105 |
| 5,084,791 | 1/1992 | Thanos et al. | 360/77.04 |
| 5,119,254 | 6/1992 | Brown et al. | 360/106 |
| 5,396,388 | 3/1995 | Brown | 360/106 |
| 5,448,435 | 9/1995 | Nakazawa et al. | 360/105 |
| 5,453,891 | 9/1995 | Takemoto | 360/105 |

*Primary Examiner*—Matthew V. Nguyen
*Attorney, Agent, or Firm*—Flehr, Hohbach, Test, Albritton & Herbert

[57] ABSTRACT

A moving magnet electromagnetic motor wherein the moving magnet is attached to, and moves integrally with, the back iron flux return path portion. The preferred embodiment utilizes a two-pole fixed stator with an energizing coil wrapped about each pole. However, the present invention is applicable to motors with any number of stator pole pieces and energizing coils. Current applied to the energizing coil or coils create a magnetic field which propels the moving magnet and moving back iron combination. The invention is ideal for use as a disc drive read/write head positioning actuator. The invention provides a positioner of reduced size. In addition, the moving magnet and back iron structure doubles as a counterweight to the head structure which simplifies and reduces the size of the disc drive. A further improvement upon the current invention involves embedding the permanent magnet into the back iron flux return path portion, such that the two pieces are substantially coplanar. This improvement further simplifies the motor and reduces its size.

20 Claims, 9 Drawing Sheets

2-POLE SINGLE OR DUAL COIL MOVING MAGNET MOTOR WITH MOVING BACK IRON

This is a continuation of application Ser. No. 08/276,874 filed Jul. 18, 1994 now abandoned, which is a continuation of application Ser. No. 07/541,845 filed Jun. 21, 1990 now abandoned.

BACKGROUND OF THE INVENTION

The invention pertains generally to electromagnetic moving magnet motors, and more particularly to moving magnet motors having an integral moving magnet and back iron flux return path structure.

In moving magnet motors, a thin magnet is moved in a linear direction by interaction of magnetic forces between the moving magnet and the stationary stator structure. A coil or coils wound about the stator structure is energized by an applied voltage to develop a magnetic field that interacts with the movable magnet. The magnet is propelled in a linear direction by the magnetic field generated by the stator structure. The same concepts apply to rotary motors except the electromagnetic force emanating from the stator interacts tangentially with the moving magnet structure propelling the magnet about an axial pivot.

Heretofore, stator structures have been constructed with three or more poles. In addition, the previous stator designs always maintained a stationary back iron which may or may not provide a return path for the magnetic flux. Such moving magnet motors with stationary stators have been disclosed in U.S. Pat. No. 4,775,908, Swiss Patent Application No. CH 669,064 A5, and French Patent Application No. 89/08051. These aforementioned designs incorporate three major components: a pole piece, coil or coils, a moving magnet, and a back iron structure. The result is a significant overall space requirement for the motor.

The overall space requirement for moving magnet motors has become increasingly critical. A number of applications, such as small disk drives, require extreme miniaturization that is not feasible using the embodiments of the apparatus described in the prior art.

The objective of the current invention is to provide a useful solution to the overall space problem and to simplify overall motor design. The objective is attained by attaching a back iron which functions as a flux return path portion to the moving magnet, producing a motor with a moving back iron and magnet combination. In addition, the copper per volume ratio is increased resulting in an intensified flux field and a simplified motor design.

SUMMARY OF THE INVENTION

In summary, the present invention is an electromagnetic moving magnet and back iron motor. In a preferred embodiment, the motor uses a two-pole stationary stator structure and an energizing coil wrapped about each pole to move in a rotary fashion an integral permanent magnet and back iron structure. However, any number of stator poles and stator pole coil combinations may be used to accelerate the moving magnet member. The direction and rate of movement of the permanent magnet and back iron structure is determined by the magnitude of the magnetic fields generated by the energized pole pieces. Each of the magnetic field magnitudes can be varied by changing the magnitude of the coil energizing current.

Another embodiment of the present invention embeds the permanent magnet into the back iron flux return path portion, such that they are coplanar. The magnitude and polarity of the energizing current determines the direction and acceleration of the moving member. The coplanar moving magnet and back iron structure design minimizes the space required for the motor and simplifies the motor design.

In keeping with another aspect of the present invention, the permanent magnet and back iron structure is an actuator for moving the read/write head of a disk drive. The invention reduces the size of the drive and simplifies its design.

In accordance with the another aspect of the present invention, the permanent magnet and back iron structure is used as a counterweight balance for a disk drive read/write head positioning arm. Current designs of small disk drives position the read/write head far from the pivot point. Consequently, 60% of the inertia is due to head placement. The attachment of the back iron to the moving magnet provides a counterweight to balance the read/write arm; thus, eliminating the need for any other counterweight structure and realizing a substantial space savings. The attachment of the back iron to the arm stiffens the entire structure, and consequently raises the resonant frequency of the disk drive arm creating a more stable system.

DETAILED DESCRIPTION OF A PREFERRED EMBODIMENT

Figure 1A:
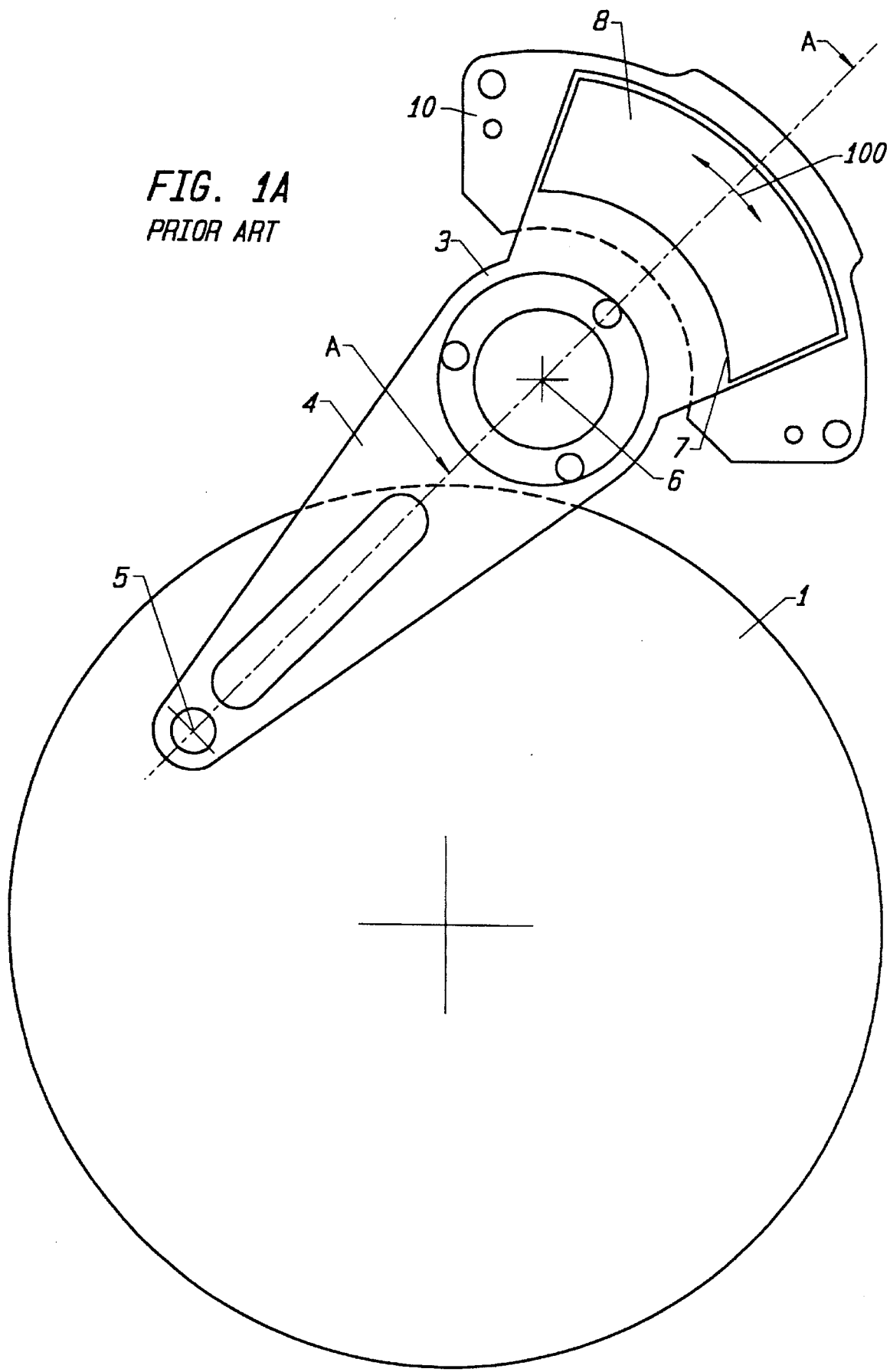
FIG. 1A is a schematic of the prior art as applied to a disc drive read/write head actuator.
Figure 1B:
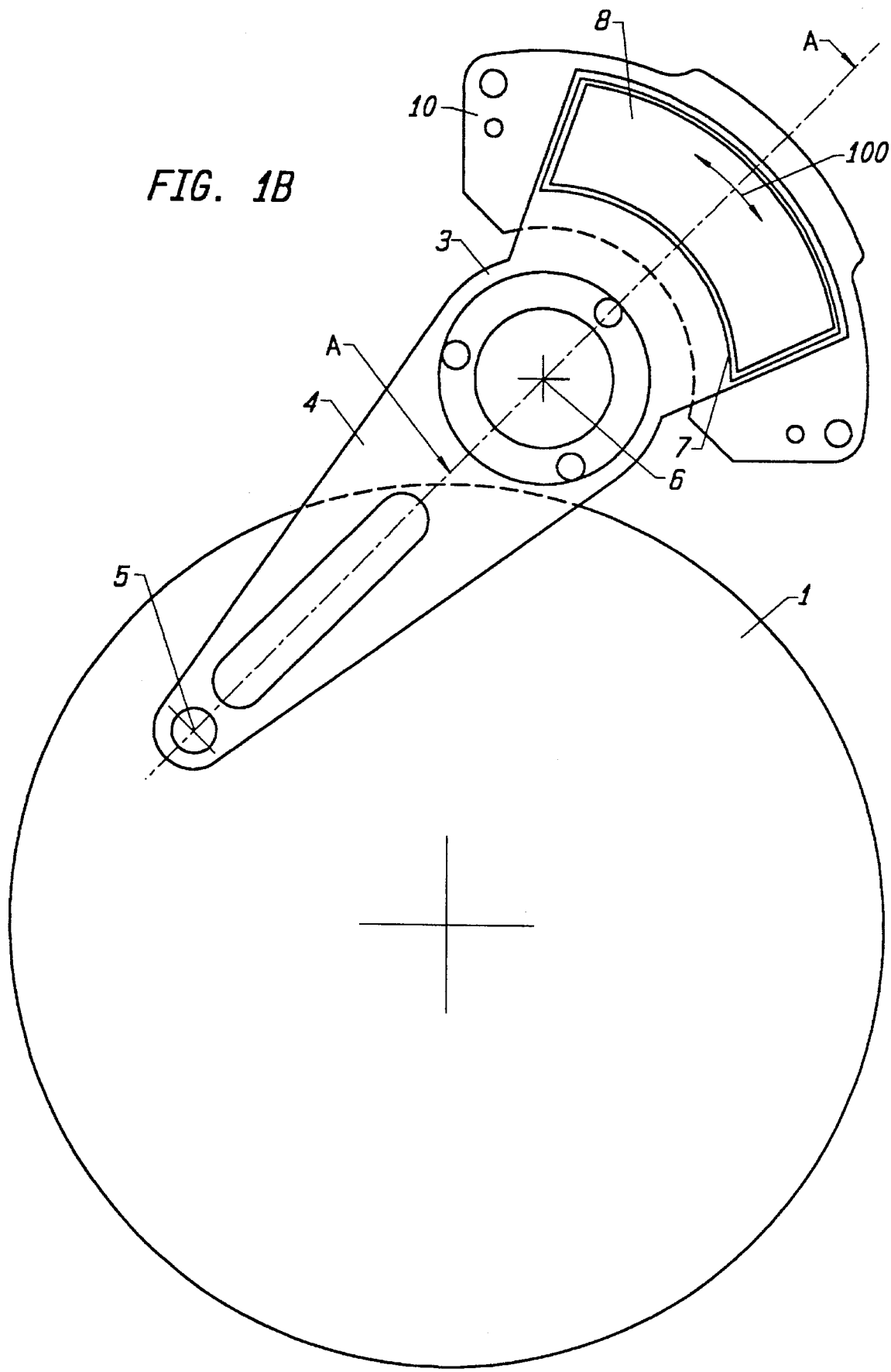
FIG. 1B is a schematic view of a preferred embodiment of the invention.

FIG. 1A depicts an exemplary prior art moving magnet motor as shown in Oudet U.S. Pat. No. 4,985,652, as utilized in a hard disc drive read/write head positioning system. The read/write head 5 is positioned over the desired portion of the disc 1 by rotating the arm 4 about an axial pivot 6 in the directions indicated by arrow 100. The force to move the arm 4 to a predetermined portion of the disc 1 is provided by a motor designed according to the principles of this invention. A magnet is supported at the rear of the arm to move the actuator in response to currents passing through coils (not shown) parallel to the magnet. As shown in FIG. 1B, an exemplary embodiment of the invention is comprised of a thin magnet 8 permanently attached to a back iron flux return path portion 7 which is attached to the arm 4 mechanism. In addition, a stationary stator structure 10 is located directly below the movable magnet structure.

Figure 2:
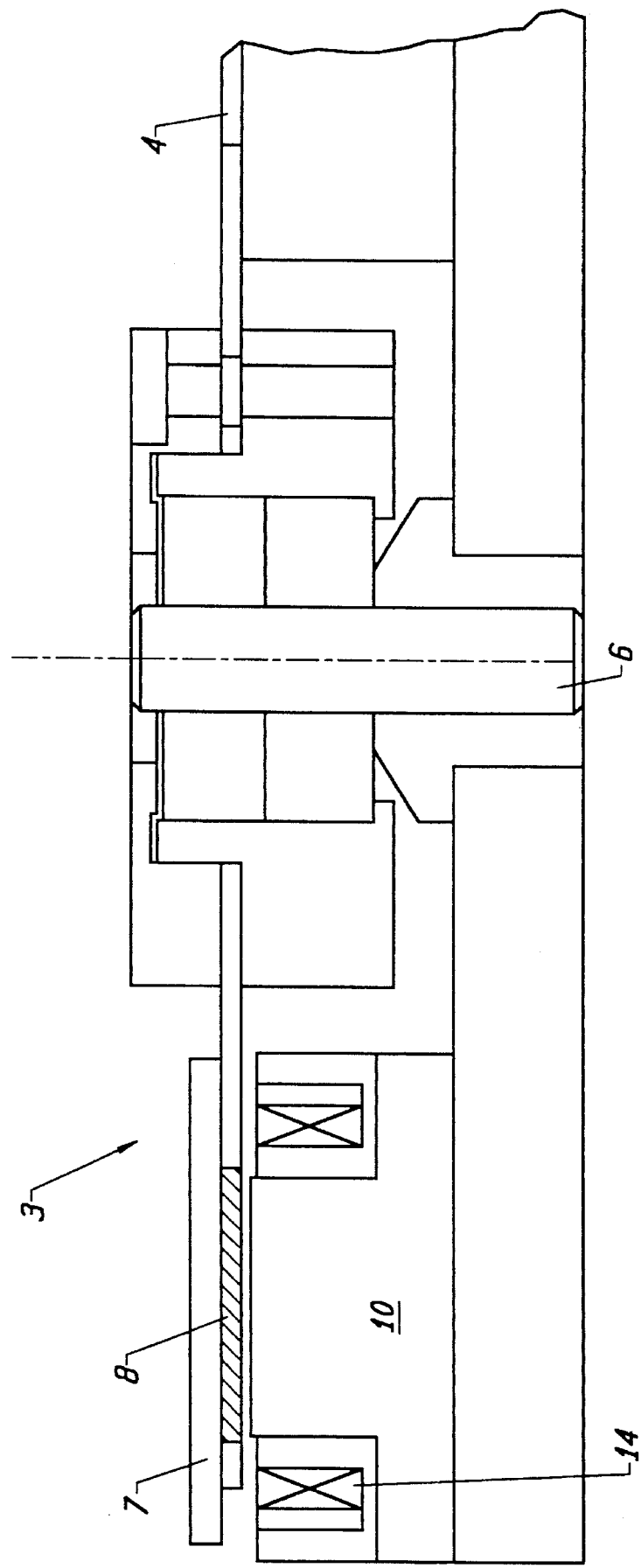
FIG. 2 is a side view of FIG. 1A.

FIG. 2 shows the disc drive actuator mechanism from a more informative sectional view. The preferred embodiment of the moving magnet motor includes a stationary stator part 10, two energizing coils 14 and a movable member 3 formed by a movable flux return path portion, also known simply as a back iron 7, and a thin magnet 8. The thin magnet 8 is oriented such that its magnetic poles are transverse to the direction of motion.

Figure 3:
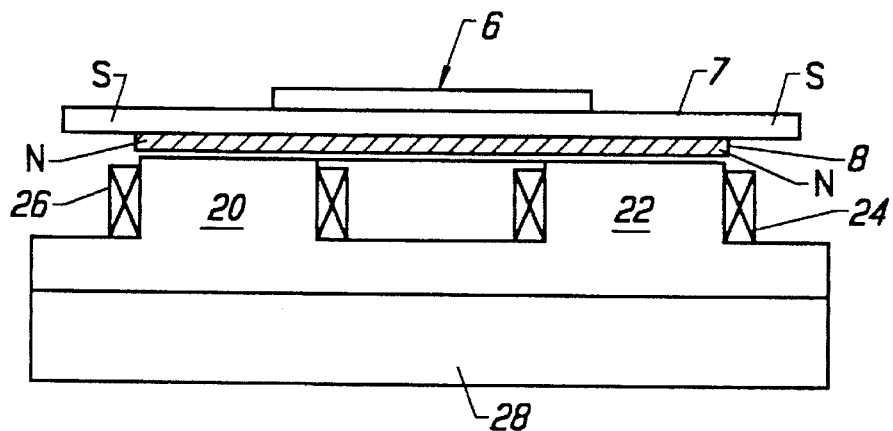
FIG. 3 is a rear view of FIG. 1A.

Both the back iron 7 and the stator 10 are constructed from a very high magnetic permeability material. FIG. 3 shows a sectional rear view of the disc drive read/write head positioner embodiment. The thin permanent moving magnet 8 is attached to the back iron 7; thus, both move as an integral unit. The stator portion contains two poles 20, 22 each wrapped with a coil 26, 24. The stator is mounted upon a mounting plate 28.

Figure 4:
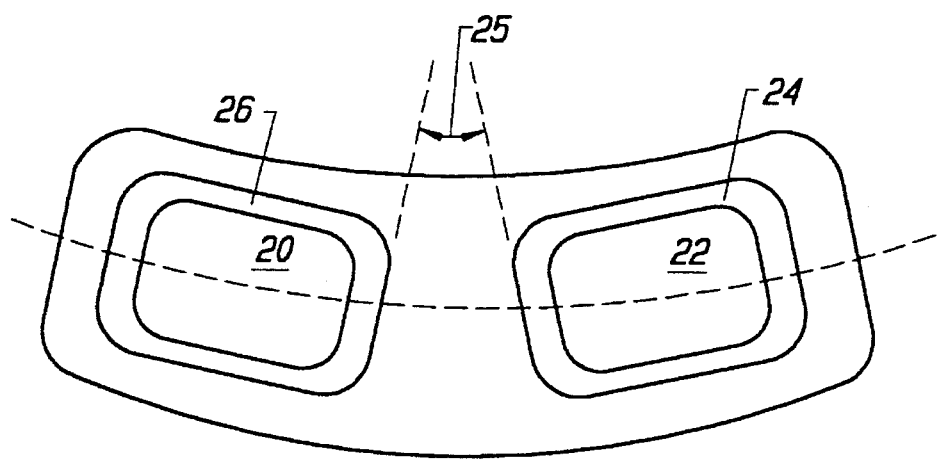
FIG. 4 is a section view of the stator and coil set used in the disc drive application of this invention.

A top view of the stator, FIG. 4, reveals that the poles 20, 22 are aligned along the rotational axis 6. Each coil 24, 26 is wrapped about a respective pole piece 22, 20. In the preferred embodiment, the total arc length of the permanent magnet 8 is twice the arc length of a stationary pole 20, 22. In addition, the radial width of each pole is the same as the radial width of the permanent magnet 8.

Figure 5:
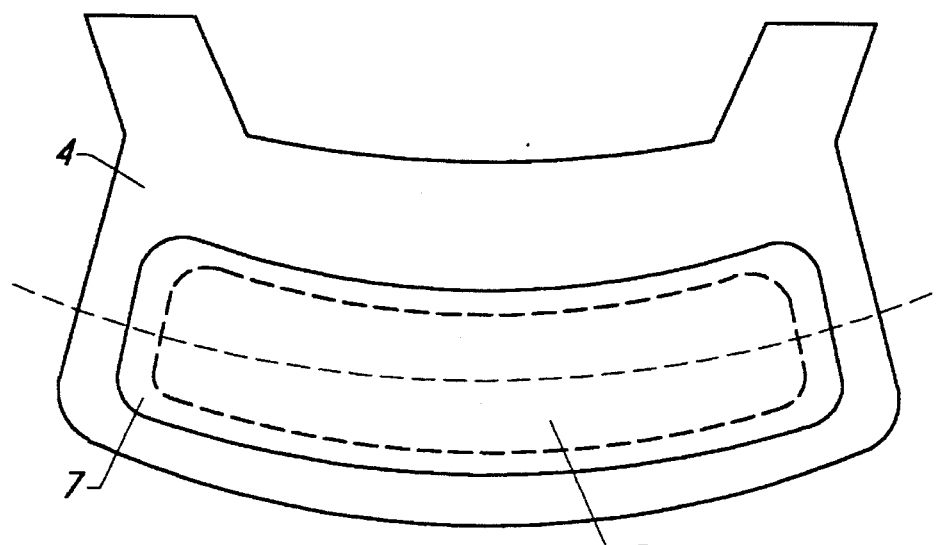
FIG. 5 is a top view of the back iron as used in the disc drive application.

FIG. 5 depicts a top view of the head positioning arm 4 showing the mechanical construction of the permanent magnet 8 and the back iron 7. The back iron 7 is slightly larger in all dimensions than the permanent magnet 8. The back iron 7 and magnet 8 are integral parts of the head positioning arm 4. The weight of the back iron provides a counterweight to balance the arm 4 of the head positioner. Thus, the usual counterweights are not necessary, and an improvement in space utilization and system simplification over the prior art is realized. In attaching the back iron according to this invention, the positioning arm structure is stiffened providing a higher resonant frequency and augmented stability.

When the coils 24, 26 are energized by a fixed current, the permanent magnet 8 will accelerate, and the head will travel toward the next or target track on the disc 1. The opposite movement will occur as a negative current is applied to the coil 24, 26. The spacing of the poles 20 and 22 is determinative of the arc through which the head positioning arm 4 will swing. The position of the arm 4 can be strictly controlled by controlling the magnitude and orientation of the magnetic field of each coil and pole combination. The magnetic field magnitude is a function of the magnitude of the applied current to each coil, while the magnetic field orientation is a function of the applied current's polarity.

An example of the preferred embodiment has a back iron 7 arc length of 133 degrees measured with respect to the head positioning arm pivot 6, a permanent magnet 8 arc length of 65 degrees, and a 1 mm thickness, and a stator pole 20, 22 arc width of 33 degrees and a thickness of 4 mm. In addition, a space between the stator poles 20, 22 of 32 degrees, and a clearance between the permanent magnet 8 and the stationary poles 20, 22 of 1.5 mm is used.

Figure 6:
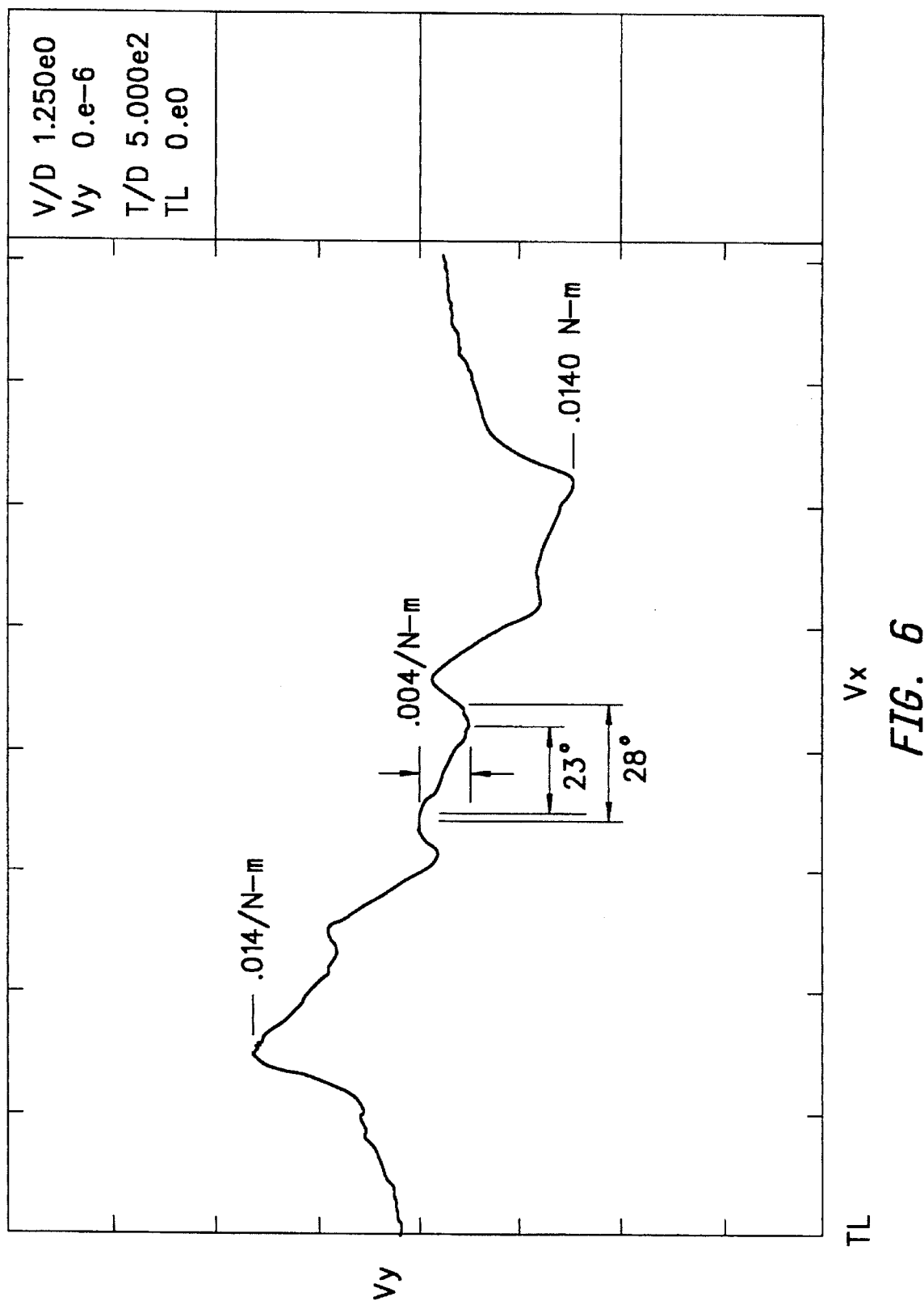
FIG. 6 is a graph of detent torque versus moving member position of an exemplary motor with a 1.5 mm clearance.

The detent torque of the example motor was experimentally determined to be 0.0041 N-M over a 28 degree motor movement range. A graph of the detent torque versus the full range of the motor's movement appears in FIG. 6.

Figure 7:
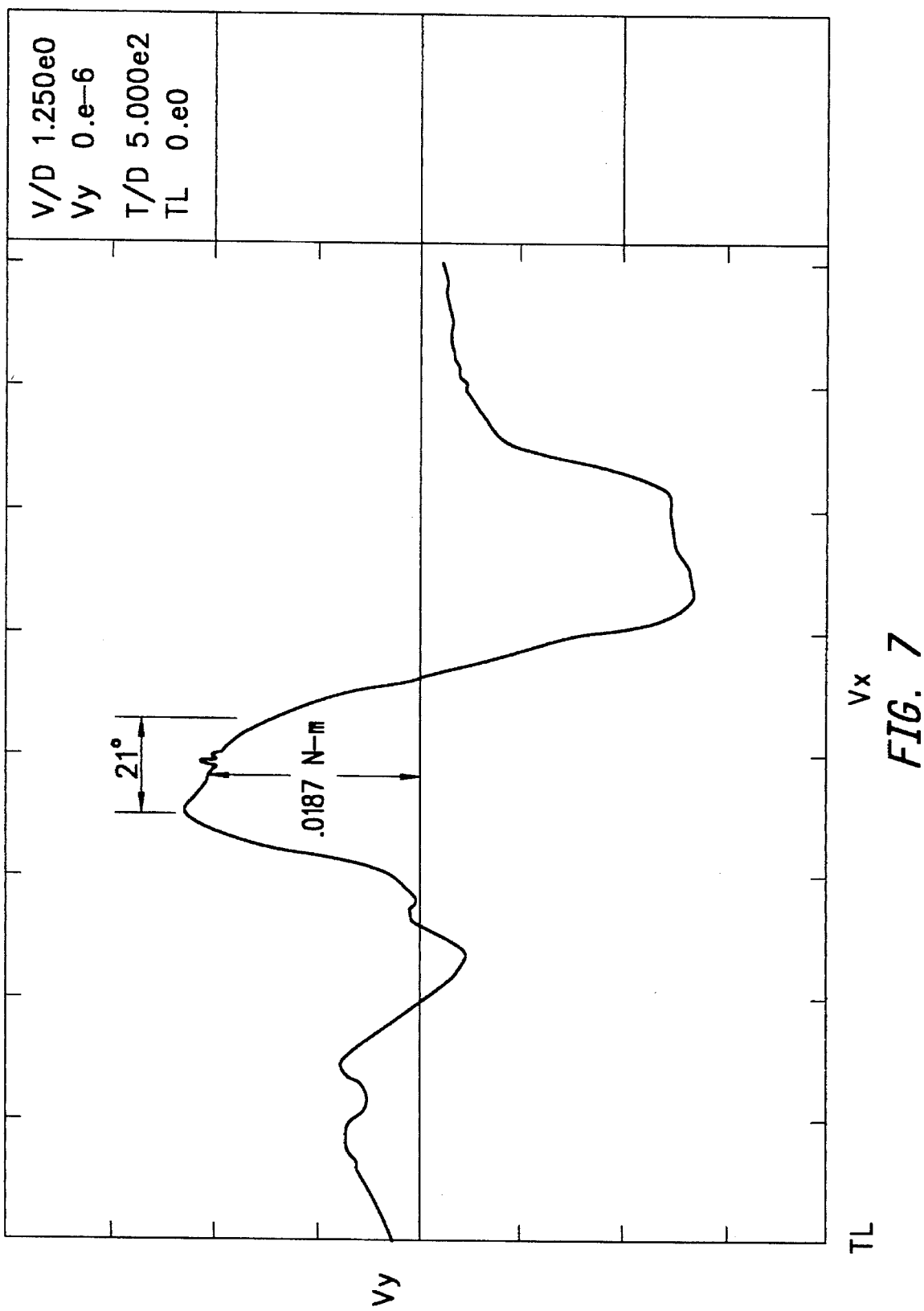
FIG. 7 is a graph of torque versus moving member position of an exemplary motor with a 1.5 mm clearance.

The torque constant for the exemplary motor was determined by applying a fixed current to each of the energizing coils 24, 26. The difference between the current applied to each coil was 0.5 A. The torque constant according to this method was determined to be 0.038 N-M/A. A graph of the torque versus motor position appears in FIG. 7.

Figure 8:
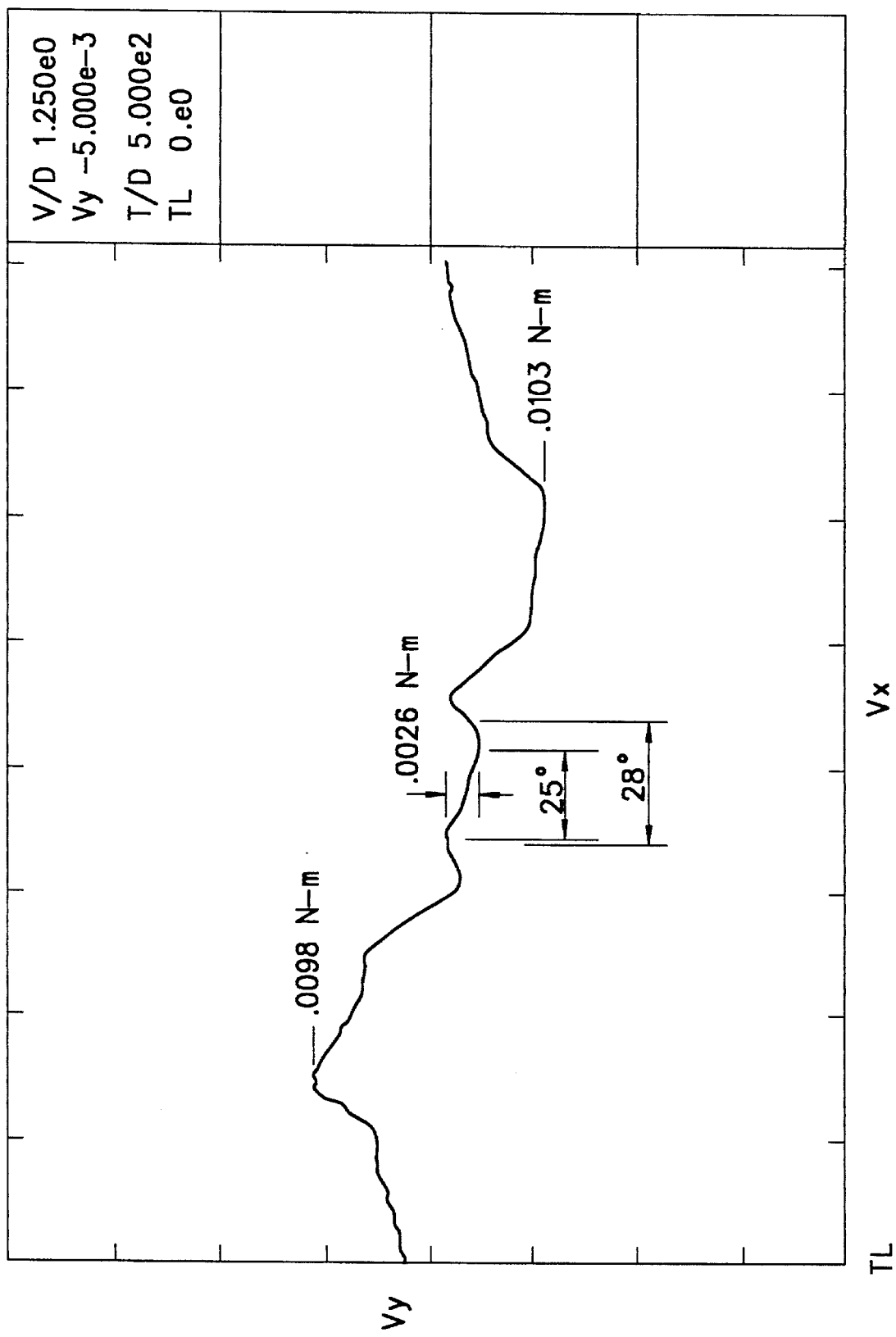
FIG. 8 is a graph of detent torque versus moving member position of an exemplary motor with a 2.5 mm clearance.
Figure 9:
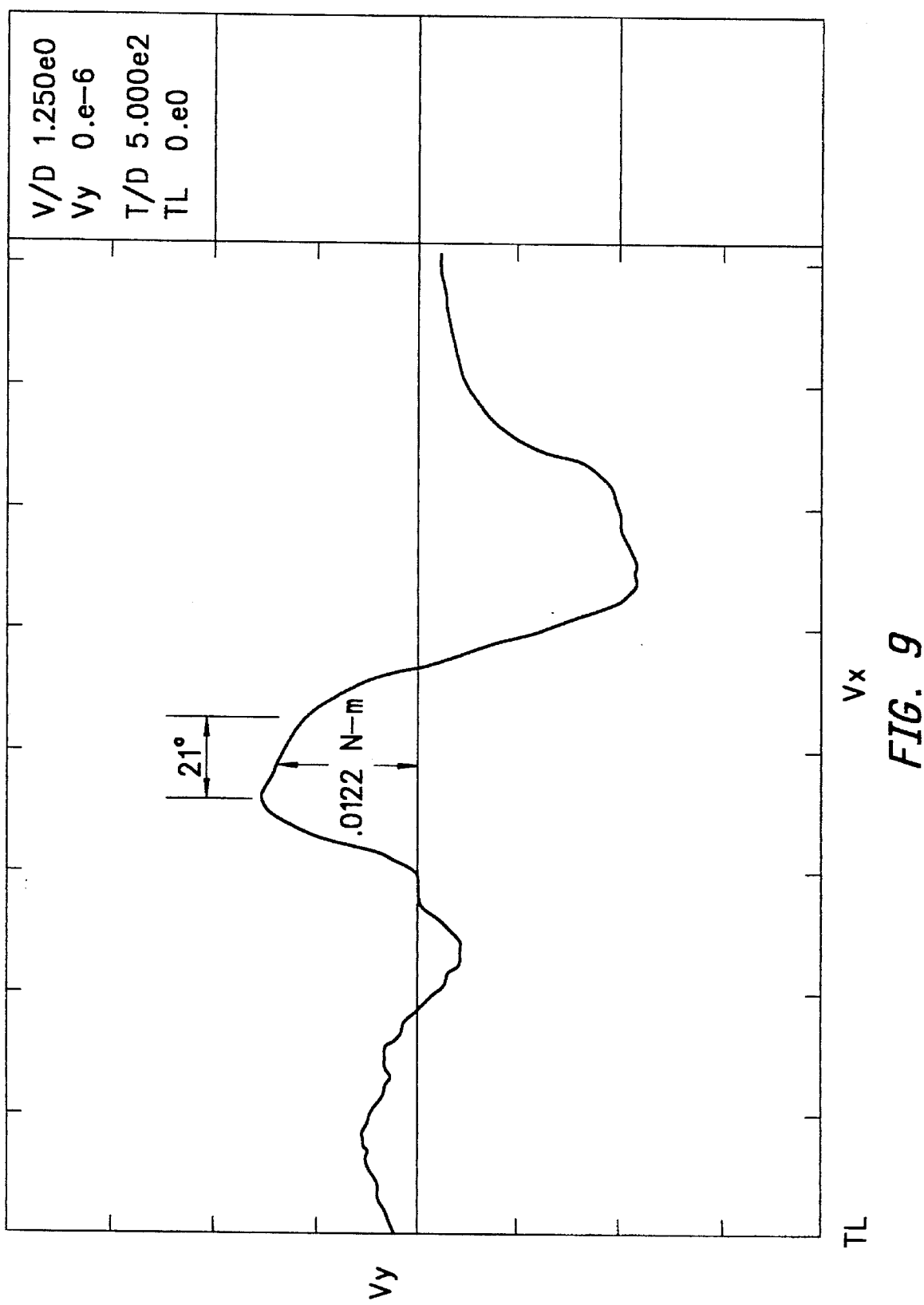
FIG. 9 is a graph of torque versus moving member position of an exemplary motor with a 2.5 mm clearance.

A second example of the preferred embodiment maintained the same parameters as the first example except the clearance between the permanent magnet 8 and the stator poles 20, 22 was increased to 2.5 mm. The detent torque over a 28 degree permanent magnet and back iron displacement was 0.0026 N-M. The graph of detent torque versus motor position is shown in FIG. 8. The torque constant for this second example motor was found to be 0.024 N-M/A. The graph of torque versus motor position appears in FIG. 9.

Figure 10:
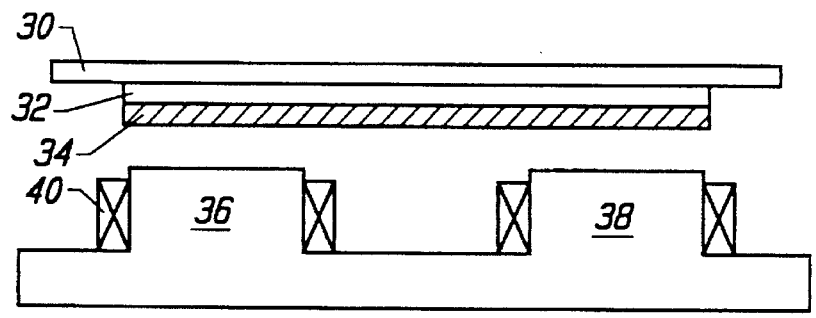
FIG. 10 is an illustration of an alternative embodiment of the invention that includes a non-magnetic spacer between the back iron and the moving magnet.

An alternative embodiment depicted in FIG. 10 includes a non-magnetic spacer 32 separating the back iron 30 from the thin permanent magnet 34. This adaptation is functionally equivalent to the preferred embodiment. However, the spacer 32 reduces the detent torque and torque constant for the motor. These variations may be beneficial in some applications of the invention.

Figure 11:
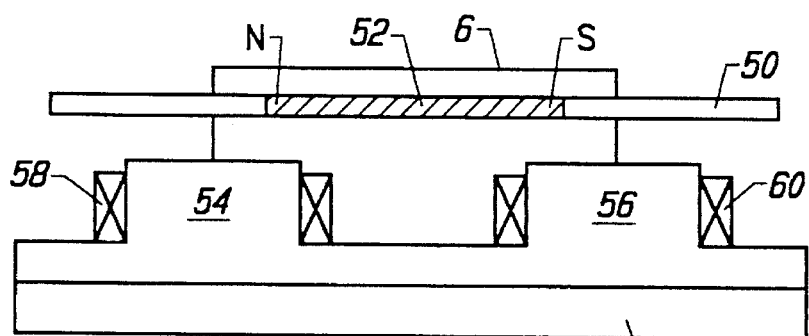
FIG. 11 is an illustration of another alternative embodiment of the invention that has the moving permanent magnet embedded coplanarly into the moving back iron.

Another alternative embodiment is shown in FIG. 11. Here, the thin magnet 52 is embedded in the back iron 50 so that the two elements are coplanar. The magnet 52 is magnetized in the plane of motion. This embodiment is functionally equivalent to the preferred embodiment. However, the alternative further reduces the space requirement for the invention.

Figure 12:
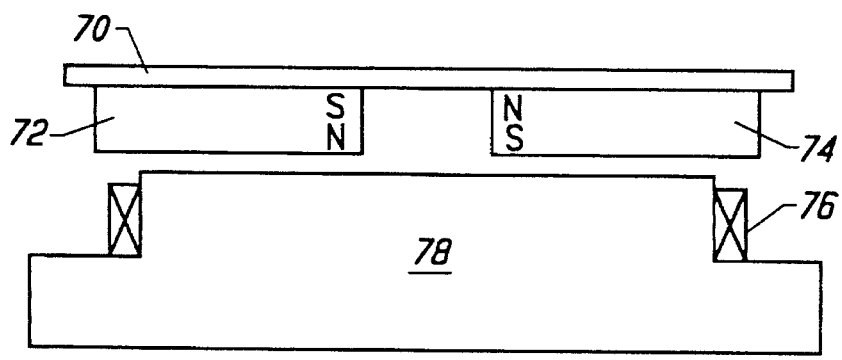
FIG. 12 depicts another alternative embodiment of the invention that uses a single coil, single pole stator structure to move a dual magnet moving back iron structure.

Another alternative motor embodiment, depicted in FIG. 12, is realized using only one energizing coil 76 on a single-pole stator structure 78 with two permanent magnets 72, 74 attached to the back iron 70. Each magnet's polarization is transverse to the plane of motion. For example, one magnet 72 is polarized with the south pole nearest to the back iron. The single coil-dual magnet embodiment is functionally equivalent to the preferred embodiment. However, this alternative will have lower power consumption, have an intensified flux density, and be less massive, since only one coil is used.

Figure 13:
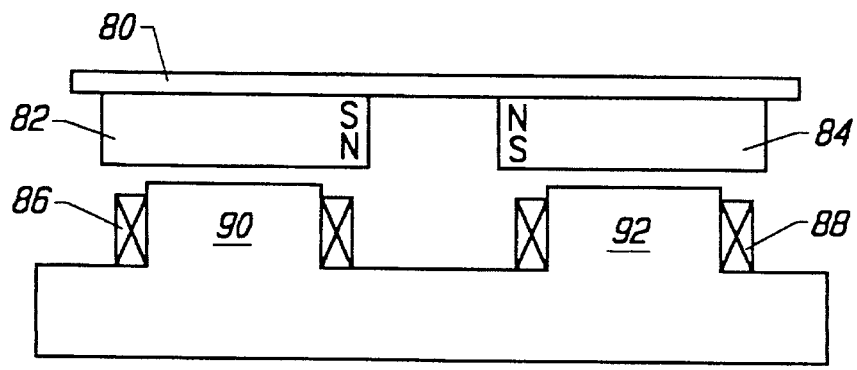
FIG. 13 depicts another alternative embodiment of the invention incorporating the dual coil, dual pole stator of FIG. 3 with the dual magnet moving back iron structure of FIG. 12.

FIG. 13 illustrates another alternative motor design using the present invention. It incorporates the dual moving magnet 82, 84 feature, discussed above, with the dual-pole 90, 92, dual coil 86, 88 stator feature of FIG. 3. The magnets 82, 84 are oriented such that their magnetic poles are transverse to the direction of motion. The magnets are attached to the back iron 80 comprising a single moving member. The stator poles 90, 92 are wrapped with coils 86, 88 providing the magnetic flux to accelerate the moveable member.

The inventive concept of attaching the back iron flux return path portion to the moving magnet to form a planar integrated moving member moving back and forth in a planar path over the energizing coils is applicable to any type of embodiments are not meant to limit the application to motors with a specific number of stator pole pieces, energizing coils, or permanent magnets.

It is apparent from the foregoing that a new and improved rotary moving magnet motor has been provided. While only certain presently preferred embodiments have been described, as will be apparent to those familiar with the art, certain changes and modifications can be made without departing from the scope of the invention as defined by the following claims.

What is claimed is:

1. An electromagnetic motor comprising:
   a fixed stator structure constructed of high permeability material having at least one pole,
   a planar moving magnet member formed with at least one pole having a substantially linear magnetization over its working range,
   a moving back iron flux return path portion constructed of high permeability material and supported on said moving magnet member,
   at least one energizing coil connected to and operating in conjunction with the fixed stator portion which when energized by a current will establish a magnetic flux that will accelerate said magnet member and said moving back iron flux return path portion in proportion to the applied current.

2. An electromagnetic motor of claim 1, wherein said moving back iron flux return path portion includes the moving magnet member embedded in a coplanar fashion within its structure.

3. An electromagnetic motor of claim 1, wherein said moving back iron flux return path portion is mechanically attached to and overlies the moving magnet member.

4. A single-phase electromagnetic motor comprising:
   a fixed stator structure constructed of high permeability material having at least one pole,
   a planar moving magnet member formed with N pairs of poles having a substantially linear magnetization over its working range,
   a moving back iron flux return path portion constructed of high permeability material supported on said moving magnet member, and
   at least one energizing coil connected to and operating in conjunction with the fixed stator portion which when energized by a current will establish a magnetic flux that will accelerate said magnet member and said moving back iron flux return path portion in proportion to said applied current.

5. An electromagnetic motor of claim 4, wherein said moving back iron flux return path portion is mechanically attached to and overlies the moving magnet member.

6. An electromagnetic motor of claim 4, wherein said moving back iron flux return path portion includes said moving magnet member embedded in a coplanar fashion within its structure.

7. In a disc drive comprising at least one rotating disc for storing data on concentric tracks, said rotating disc being mounted on a spindle motor which may be energized for constant rotation, an actuator arm having a first end supporting a transducer over a selected one of said tracks for reading and writing data on said selected track, said arm being rotatable around a pivot, said actuator arm first end extending out over said disc from said pivot, said arm being moved by an electromagnetic motor extending from a second end of said actuator arm, said motor comprising a fixed stator structure constructed of high permeability material having at least one pole,
   a moving magnet member supported on said actuator arm second end extending over said fixed stator structure, a moving back iron flux return path portion constructed of high permeability material and permanently attached to said moving magnet member, and at least one energizing coil connected to and operating in conjunction with the fixed stator portion which, when energized by current, will establish a magnetic flux that will accelerate said magnet member and said moving back iron flux return path portion in proportion to the applied current.

8. A motor in a disc drive as claimed in claim 7, wherein said moving magnet member is formed with at least N pair of poles, each pair of poles being oriented perpendicular to a lateral direction of motion of said moving magnet member relative to said fixed stator structure.

9. An electromagnetic motor as claimed in claim 7, wherein said moving back iron flux return path portion is slightly larger in its length and width dimensions than the dimensions of said permanent magnet of said moving magnet member, said moving back iron flux return path portion and said moving magnet member being integral parts of the head positioning arm of said disc drive.

10. The electromagnetic motor of claim 7, wherein the dimensions of said moving back iron flux return path portion are selected to define a combined weight for said moving magnet member and said moving back iron flux return path portion, such that said weight serves as a counterbalance to said transducer supporting arm of said head actuator means, whereby the need for a separate counterweight or counterbalancing mechanism for said arm is eliminated.

11. An electromagnetic motor as claimed in claim 10, wherein said moving back iron flux return path portion has an arc length of about 133° measured with respect to the head positioning arm pivot, and said permanent magnet arc length of about 65°.

12. An electromagnetic motor as claimed in claim 7, wherein said moving magnet member is embedded in said moving back iron flux return path portion, such that said moving back iron flux return path portion and moving magnet member are substantially coplanar.

13. The electromagnetic motor of claim 2, wherein said embedded moving magnet member includes at least one pole polarized parallel to the direction of motion of said moving magnet member.

14. The electromagnetic motor of claim 4, wherein said N pair of poles are polarized perpendicular to the direction of motion of said moving magnet member.

15. The electromagnetic motor of claim 14, wherein each pole of said N pair of poles comprises a north and south pole end, and said N pair of poles are polarized oppositely, whereby only one the poles of said N pair of poles has a north pole end facing said moving back iron flux return portion.

16. The electromagnetic motor of claim 4, wherein said fixed stator portion, said moving back iron flux return path portion, and said moving magnet member each have an arcuate plan form.

17. The electromagnetic motor of claim 6, wherein said embedded moving magnet member includes at least one pole polarized parallel to the direction of motion of said moving magnet member.

18. The electromagnetic motor of claim 8, wherein each pole of said N pair of poles comprises a north and south pole end, and said N pair of poles are polarized oppositely, whereby only one the poles of said N pair of poles has a north pole end facing said moving back iron flux return portion.

19. The electromagnetic motor of claim 12, wherein said embedded moving magnet member includes at least one pole polarized parallel to the direction of motion of said moving magnet member.

20. The electromagnetic motor of claim 1, having a thin non-magnetic spacer interposed between said moving back iron flux return path portion and said moving magnet member, whereby the detent torque and torque constant of said electromagnetic motor is reduced.

* * * * *